Nov. 2, 1954 — O. J. GERHARDT — 2,693,284
TRUCK BED CLAMP ASSEMBLY FOR LOADING PLATFORMS
Filed May 27, 1952 — 2 Sheets-Sheet 1

OTTO J. GERHARDT
INVENTOR

BY *Smith & Tuck*
ATTORNEYS

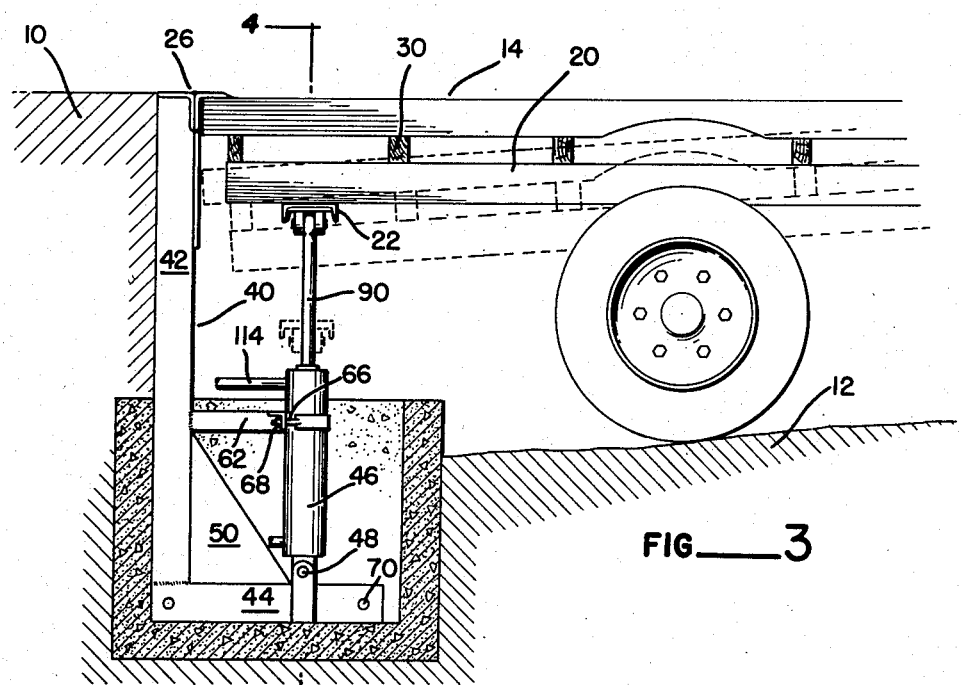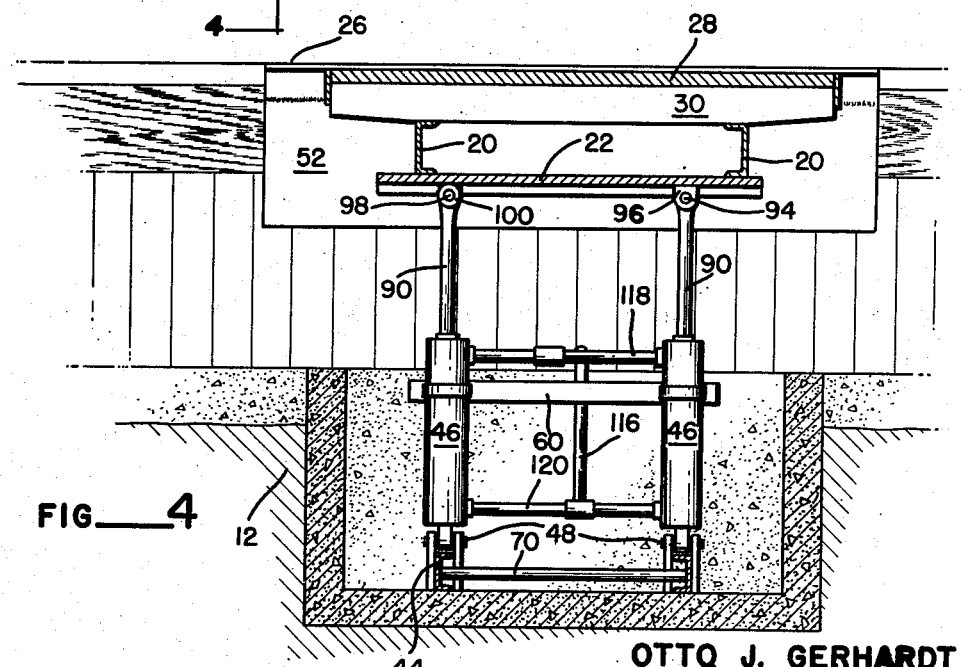

United States Patent Office 2,693,284
Patented Nov. 2, 1954

2,693,284

TRUCK BED CLAMP ASSEMBLY FOR LOADING PLATFORMS

Otto J. Gerhardt, Yakima, Wash., assignor to Valley Evaporating Company, Yakima, Wash.

Application May 27, 1952, Serial No. 290,293

3 Claims. (Cl. 214—38)

My invention relates to loading platform equipment, and, more particularly, to a truck bed clamp assembly for a loading platform. Briefly, this comprises a lip extending outwardly horizontally from the loading platform along a portion of its edge, an elongated lift beam disposed parallel to the said edge and a pair of hydraulic pistons and cylinders positioned under the clamp member. One piston supports each end portion of the lift beam and moves the lift beam from a lower position to a position nearer the level of the lip to clamp a truck bed therebetween.

The use of fork trucks and the like for moving loads between various locations in an industrial establishment such as a factory or warehouse and into and out of railroad cars has resulted in a saving of time and money which has been of considerable importance to modern industry. During the same period, the trucking industry has become one of the principal carriers of goods, often replacing the railroad in the transportation of goods in certain industries. Fork trucks have not been used generally for direct loading upon motor vehicles as they are used in railroad cars, because the vehicle beds were not stably supported. Considerable man power and expense could be saved if such direct loading on trucks were used generally.

The objects of my invention include, therefore: to provide means for clamping and stably supporting a truck bed at a loading platform so that fork trucks and the like may drive directly from the loading platform onto the truck bed; to devise means whereby lift trucks may be used in the loading of truck transports; and to provide this equipment in an economical structure which may be quickly operated and yet will clamp securely the truck beds so that accidents may be prevented.

My invention will be best understood from a reading of the following description taken with reference to the drawings, in which:

Figure 3 is a side view, partly in section, showing the clamp assembly and showing in full lines a truck bed in clamped position and, in dotted lines, the assembly before clamping; and Figure 4 is a view, partly in section, taken on line 4—4 of Figure 3.

Figure 1:
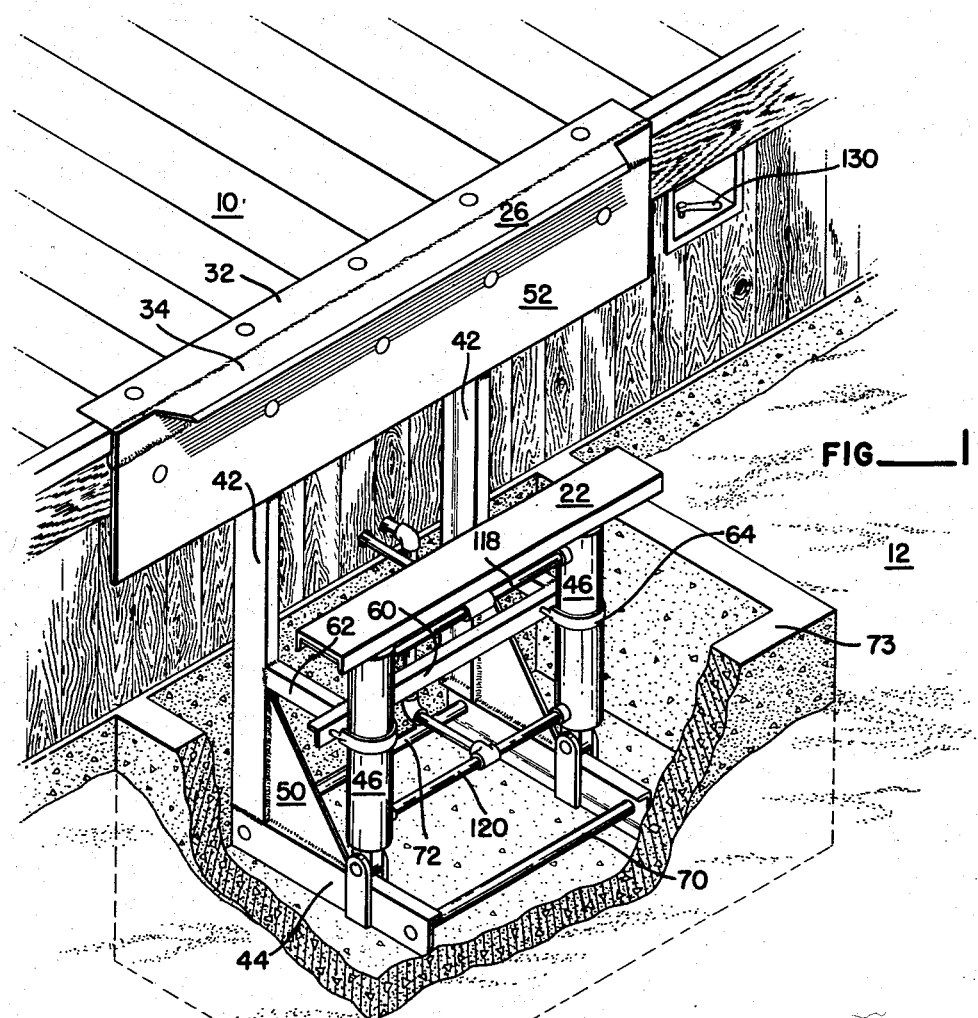
Figure 1 is a perspective view, partly in section, showing a specific embodiment of my truck bed clamp assembly.

As shown in Figure 3, the loading dock 10 is positioned above the level of the ground 12 a distance greater than the height of the usual truck bed 14. It is often convenient to have the grade slant upward from the loading dock, as shown in Figure 3, whereby the truck tends to remain in position against the loading dock and the truck bed be more level when clamped. Due to variations in the height of the bed longitudinals 20, lift beam 22 is disposed, in its lowermost position, approximately six inches below the longitudinals 20 of the usual truck.

The truck beds vary somewhat in height and it is necessary to have means for positioning the bed substantially in the plane of the floor of the loading platform. It is imperative that additional support means for the truck be provided because the lift truck and load may weigh several tons and the lift truck moves on the truck bed and does not always travel at the center of the truck bed. The danger of tipping the fork truck and load over the side of the truck bed is apparent and at best the truck springs could suffer damage. Therefore it has been thought preferable not only to clamp securely the truck bed 14, and support the same, but also to support it in a position above its normal disposition so that the truck springs may be completely relieved. This action is shown in Figure 3 and it will be noted that while the truck bed slants to the horizontal in driving up to the loading platform, it is brought back to substantially an horizontal plane when clamped.

The opposed clamping members comprise lip 26 extending out horizontally from the loading platform 10 and lift beam 22. Lift beam 22 engages longitudinals 20 of the truck bed, and lip 26 bears on floor 28 of the truck which is supported on the longitudinals by the lateral joists 30.

Lift beam 22 is preferably formed by a channel and lip 26 can be conveniently formed by a pair of L-shaped structural members 32, 34 welded together. L-shaped member 32 is secured to a rigid L-shaped supporting member 40 by welding the same to the end of vertical leg 42 of the same. Horizontal leg 44 of the L-shaped supporting member 40 supports the lower end of hydraulic cylinder 46 by a pivotal connection about pin 48 running transversely of horizontal leg 44. The horizontal and vertical legs 44, 42, are joined by gusset plate 50 welded to the same. Backing plate 52 is secured to vertical legs 42 in position to receive the impact of the end of a truck bed of a truck backing into the loading platform.

In view of the heavy load supported by lift beam 22 and the movement of the same, it has been thought better not to support hydraulic cylinders 46 too rigidly in order to avoid injury to the piston and cylinder assembly. Thus the cylinders 46 are secured by means permitting slight movement, comprising lateral member 60 secured to vertical legs 40 by members 62, and band 64 secured around cylinders 46 and having bolt ends 66 running through lateral member 60 and secured by nut 68. The two L-shaped structural members 40 are tied together at their lower end by pipes 70 and 72. The assembly is supported by the concrete footing 73 and secured to the same by appropriate means.

Due to the weight and movement of weight in this structure, the idea of having a single hydraulic ram to support the lift beam has been rejected because of the great forces laterally of its axis which would be applied on such structure. With dual pistons, lateral forces are minimized. In fact the hydraulic support in the present structure has been supported in a way permitting slight movement of the same under torsional forces to avoid the damage that would be incident to a completely rigid structure of this type.

Especially in inclement weather, the ground 12 will not be of an ideal grade and the truck bed may make an angle laterally to the horizontal. Of course the truck may have a load to be unloaded onto the loading dock instead of the reverse relationship and considerable force will be needed in order to raise this load to a clamped position. Rather than limiting the hydraulic pistons 90 to movement at the same height throughout their travel, it has been thought better practice to provide a common and interconnected source of hydraulic fluid so that the pistons may have different positions and lift beam 22 will assume the position of the longitudinals 20 of the truck bed in raising the same up to the point that the horizontal lip 26 is reached. This tends to equalize the load on each piston 90 and to prevent overloading of one piston as might be incident to a structure in which the lift beam 22 always remained horizontal. In order that pistons 90 may remain in vertical position while permitting lift beam 22 to be inclined to the horizontal, it is necessary to have means for permitting lengthening or shortening of the distance between the points of support of pistons 90 to beam 22, as well as permitting relative pivoting. This is accomplished, as shown in Figure 4, by having one piston 90 pivotally secured to beam 22 by pin 94 running through flanges 96 on beam 20 and having a pin 98 on the other piston rod supporting a pair of rollers 100 which are guided in the channel of beam 22.

Figure 2:
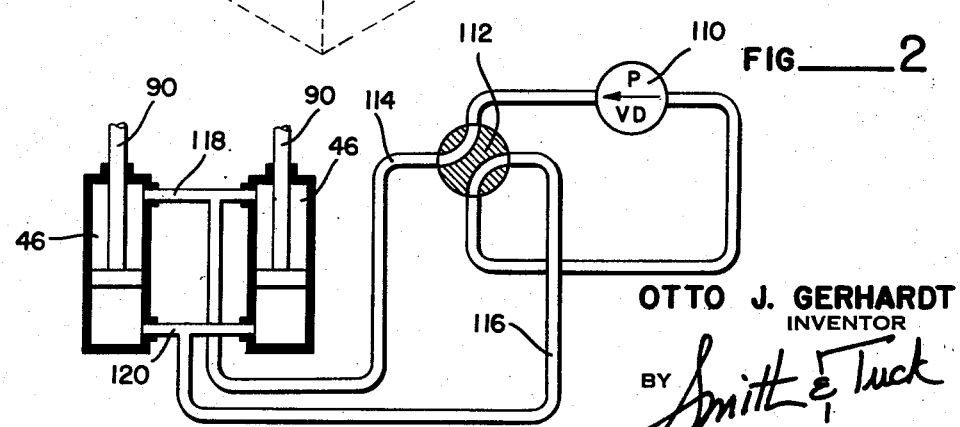
Figure 2 is a schematic view of the hydraulic cylinders and supply means.

The supply system of hydraulic pressure to cylinders 46 is shown in Figure 2. An hydraulic cylinder of fiveinch bore and twenty-four inch stroke has been found suitable. A delivery pump 110 supplies liquid to the cylinders through valve 112, and branches 114 and 116 join the upper and lower ends of cylinders 46 in a manner permitting free access of fluid therebetween through the common lines 118, 120. Manual control handle 130 of valve 112 is positioned in the wall of the loading dock, to regulate fluid flow and control the direction of movement of pistons 90.

Having thus described my invention, I claim:

1. A truck bed clamp assembly for a loading dock, comprising: a rigid flange lip extending immovably outward flush with the deck surface of said loading dock along a portion of its edge long enough to substantially overlap the rear edge of a truck bed; an elongated lift beam positioned parallel to and below said lip in a position to engage under the tail of a truck bed; a pair of hydraulic expansible-contractible motors vertically operable under said lift beam, one motor supporting each end portion of said lift beam and movable from a lower position to a position to clamp a truck bed under said flange lip; and means for providing fluid under pressure to said motors.

2. A truck bed clamp assembly for a loading dock, comprising: a frame having a foot portion and a pair of spaced-apart upright supporting members rising from a common edge of said foot portion, said upright supports being juxtaposed to the dock face; a rigid flange lip extending immovably outward flush with the deck surface of said loading dock and attached to said upright supporting members, said lip extending along a portion of said dock sufficiently to substantially overlap the rear edge of a truck bed; a pair of hydraulic expansible-contractible motors vertically supported above the foot portion of said frame in advance of said upright supporting members; an elongated lift beam positioned parallel to and below said lip in a position to engage under the tail of a truck bed, said beam being supported near its opposite ends by said motors and movable from a lower position to a position to clamp a truck bed onto said flange lip; and means for providing fluid under pressure to said motors.

3. A truck bed clamp assembly, comprising: a loading dock and a frame positioned in front of said loading dock having a foot portion and a pair of spaced-apart upright supporting members rising from a common edge of said foot portion, said upright supports being juxtaposed to the dock face; a rigid flange lip extending immovably outward from said dock flush with the deck surface thereof and attached to said upright supporting members, said lip extending along a portion of said dock a sufficient distance to substantially overlap the rear edge of a truck bed; a pair of hydraulic expansible-contractible motors vertically supported above the foot portion of said frame in advance of said upright supporting members; an elongated lift beam positioned parallel to and below said lip in a position to engage under the tail of a truck bed, said beam being supported near its opposite ends by said motors and movable from a lower position to a position to clamp a truck bed against said flange lip; and means for providing a common source of fluid under pressure to said motors in a manner interconnecting the same to equalize the pressure in the motors.

References Cited in the file of this patent

UNITED STATES PATENTS

| Number | Name | Date |
|---|---|---|
| 302,721 | Foreman | July 29, 1884 |
| 2,489,869 | Dunn | Nov. 29, 1949 |
| 2,565,072 | French | Aug. 21, 1951 |